United States Patent
Piannikov et al.

(12) 
(10) Patent No.: US 12,267,148 B2
(45) Date of Patent: Apr. 1, 2025

(54) METHOD FOR TRANSMITTING DATA BY A SENSOR OF A WIRELESS SAFETY SYSTEM AND A WIRELESS SAFETY SYSTEM FOR IMPLEMENTATION OF METHOD

(71) Applicant: AJAX SYSTEMS CYPRUS HOLDINGS LTD, Nicosia (CY)

(72) Inventors: Serhii Dmytrovych Piannikov, Kyiv (UA); Oleksandr Mykolayovych Tantsiura, Kyiv (UA); Oleksii Yulianovych Biliavskyi, Zhytomyr region (UA)

(73) Assignee: AJAX SYSTEMS CYPRUS HOLDINGS LTD, Nicosia (CY)

( * ) Notice: Subject to any disclaimer, the term of this patent is extended or adjusted under 35 U.S.C. 154(b) by 472 days.

(21) Appl. No.: 17/454,192

(22) Filed: Nov. 9, 2021

(65) Prior Publication Data
US 2022/0209862 A1 Jun. 30, 2022

(51) Int. Cl.
*H04B 7/26* (2006.01)
*G08C 17/02* (2006.01)

(52) U.S. Cl.
CPC ............. *H04B 7/265* (2013.01); *G08C 17/02* (2013.01)

(58) Field of Classification Search
CPC ................................. H04B 7/265; G08C 17/02
See application file for complete search history.

(56) References Cited

U.S. PATENT DOCUMENTS

| 9,706,573 | B2* | 7/2017 | Kountouris | ....... H04W 74/0808 |
| 10,492,068 | B1 | 11/2019 | Konotopskyi et al. | |
| 2018/0338035 | A1* | 11/2018 | Johnson | ................ G06F 3/0488 |

OTHER PUBLICATIONS

"XMODEM file transfer protocol," Sep. 9, 2021, pp. 1-3, (https://pythonhosted.org/xmodem/xmodem.html).

* cited by examiner

*Primary Examiner* — Duc C Ho
(74) *Attorney, Agent, or Firm* — Saliwanchik, Lloyd & Eisenschenk

(57) ABSTRACT

The invention refers to wireless safety systems and it relates to a method for transmitting data by a sensor of a wireless safety system that enables to transmit massive data to large distances (up to 2000 m). Also, a wireless safety system for implementation of the described method is proposed.

14 Claims, 3 Drawing Sheets

METHOD FOR TRANSMITTING DATA BY A SENSOR OF A WIRELESS SAFETY SYSTEM AND A WIRELESS SAFETY SYSTEM FOR IMPLEMENTATION OF METHOD

CROSS-REFERENCE TO RELATED APPLICATION

This application claims priority to Ukrainian Application No. a 2020 08498, filed Dec. 31, 2020, which is hereby incorporated by reference in its entirety.

FIELD OF THE INVENTION

The invention refers to wireless safety systems and it relates to a method for transmitting data by a sensor of a wireless safety system that enables to transmit massive data to large distances (up to 2000 m). The invention may be used for security alarm systems.

PRIOR ART

A method for data transmission by means of a XMODEM protocol is known, which provides a data exchange of two computers through a modem (a peer-to-peer type exchange). The XMODEM utilizes a half-duplex data exchange principle by blocks of 128 bites with a handshaking codes ACK/NACK and data checking by means of a CRC. The XMODEM just like the most of file transmission protocols divides the data to be transmitted into a series of data packets, which are sent to a receiver, together with an additional information that allows a user to determine whether the packet has been received correctly. If an error is detected, the user will ask to send the packet again. Several incorrect data packets will interrupt the transmission. Due to simplicity and available documentation, the XMODEM has become widely used in many applications. In fact, most of communication packets, which are available for a PC, have an embedded support for the data transmission through the XMODEM (https://pythonhosted.org/xmodem/xmodem.html).

However, the XMODEM has drawbacks in resolving the posed task, and a main one of them lies in a very large volume of an executable code (40 Kb) that is caused by a large functionality that, in fact, is not necessary to resolve the posed task. It could not be accommodated in any of used microcontrollers due to the large volume of the executable code. Also, the XMODEM has a small bandwidth, insufficient automatic operation, since it is necessary to control the data transmission in both points, and it requires a phone line having modems connected.

A method for long range data communications using sensors with bidirectional communication capability is known, the method comprising installing a plurality of sensors configured to communicate with a central node (a central hub) configured to send and receive packets in working slots on two frequencies; selecting a frequency with the strongest signal from each particular sensor; and avoiding collisions between the bidirectional sensors by changing the working slots of the two-way sensors in each new frame by (a) creating a super-frame comprising multiple ordinary frames; (b) clocking all five multiple frames through; (c) returning the working slots to their initial positions; (d) creating a new super-frame; and (e) changing the working slot position throughout the new super-frame. Bidirectional communication guarantees that reception will be confirmed, or increases the chances that the signal will be received. Thus, it is possible to transfer information both ways, i.e., it is possible to write data into sensors and to transmit the data at long distances (U.S. Pat. No. 10,492,068B1 dated Nov. 26, 2019, inventors: Oleksandr Konotopskyi, Sergey Pyannikov, Oleksandr Tantsiura).

This method is suitable for transmitting statuses and alarms between the security sensors and the receiver (the central hub). However, this method was designed for transmission of signal, short, slow messages (packets consisting of several bytes), thereby making it impossible to transmit any massive data, e.g., images. Low rate (19200 bps) and limitation of a communication session duration of not more than 150 ms within the frame (the frame may constitute from 12 sec to 300 sec) do not enable a noise-free and highly reliable transmission of the massive data at large distances.

By definition, the proposed invention is a "add-in" for the above-mentioned method and system, which is developed to resolve the problems and drawbacks of the existing system.

TASK OF THE INVENTION

The invention is based on the task to develop a method for transmitting data by a sensor of a wireless safety system and a wireless safety system for implementation of said method, which could enable to:
1) create and provide operation of a separate data channel;
2) reduce a data transmission rate by two times;
3) change a data exchange of a series of packets.

An achieved technical effect lies in an effective and reliable noise-free transmission of the massive data (dozens and hundreds of kilobytes) within a wireless system from sensors to a receiver (a central hub) at a large distance (up to 2000 m).

SUMMARY OF THE INVENTION

The posed task is resolved by a proposed method for transmitting data by a sensor of a wireless safety system that comprises at least one sensor and a receiver, which are coupled by means of a radio communication, the method comprising: continuously exchanging data and/or data announcements, which are transmitted, by sending statuses and/or alarm signals through a main radio channel between the sensor and the receiver that is equipped with at least two radio modules, which are configured to perform the continuous data exchange, and activating a separate data channel for the data transmission using one of the radio modules that is not used for the main channel, and with a decision making unit, wherein the sensor, through said main radio channel by means of the alarm signal ("Data Pending"), sends a request regarding a necessary data transmission through the separate data channel to the receiver, by means of the decision making unit, the receiver sends to the sensor a signal regarding:
  beginning of the data transmission, or
  re-transmission of the request for using the data channel after a some time (a "Wait" command), or
  removal of the data and withdrawal of the request (a "Delete" command), or
  temporary withdrawal of the request until a separate command from the receiver is received (a "LongWait" command),
after the signal regarding the beginning of the data transmission is received, the sensor begins to transmit the data through the data channel by a continuous series of data packets, wherein at the end of the data transmission, the receiver sends a request with a control number of packets to confirm a completeness of the data transmission, after the control number of the packets and the fact that the data has been completely transmitted from the sensor are confirmed, the data channel is emptied for a next session of the data transmission, and the sensor, after the data transmission session is completed, switches to operation through the main radio channel.

According to one of preferable embodiments of the method, to resume receiving of the series of the data packets, for which the transmission has been interrupted, in response to the signal regarding the beginning of the data transmission informing, by the receiver, the sensor an address of a last received byte from a beginning of an array without gaps or nothing (nulls) to transmit the data from the beginning of the data array and the sensor begins to transmit the last received byte.

According to another preferable embodiment of the method, the alarm signal ("Data Pending") includes a description of a type of data, an information regarding a number of data and a size thereof, a code of the alarm with which this data is associated.

According to further one of preferable embodiments of the method, prior to the beginning of the data transmission through the data channel, performing a synchronization by transmitting an information regarding a position of the data within a time slot by the sensor to the receiver.

According to another preferable embodiment of the method, prior to the beginning of the data transmission through the data channel, transmitting, by the sensor, the information regarding the size and the number of packets by which the data transmission will be performed.

According to further one of preferable embodiments of the method, the sensor transmits the data through the data channel with a continuous series of data packets within a single window or within several successive windows, which are numbered.

According to further one of preferable embodiments of the method, during transmission within several successive windows, the sensor transmits a maximum number of the packet that will be transmitted within this window to the receiver prior to the transmission of the window.

According to another preferable embodiment of the method, in case an error has occurred, not more than 5 repetitions of windows occur for each transmission session.

According to another preferable embodiment of the method, if there are non-received packets after all the repetitions, the session will be repeated in future.

According to further one of preferable embodiments of the method, the data being transmitted is at least one photo file and/or test data, and/or software upgrades, and/or event records (logs).

Also, the posed task is resolved by the proposed wireless safety system that comprises a receiver and at least one sensor with a main radio channel with TDMA and a separate data channel between them, the data channel is configured to transmit data continuously, wherein said radio channels are distributed across frequencies, and the receiver comprises at least two radio modules, one of which is reserved only for creation of the separate data channel, and a decision making unit that is configured to control the data reception through the data channel.

According to one of preferable embodiments of the system, the sensor is configured to transmit an alarm signal in response to a periodical requesting of the sensor status from the receiver, a periodicity and an interval of sending the response are determined preliminary.

According to another preferable embodiment of the system, the sensor is configured to terminate the data transmission or to send the request to the receiver in absence of the response from the receiver to the alarm signal in response.

According to further one of preferable embodiments of the system, the data being transmitted is at least one photo file and/or test data, and/or software upgrades, and/or event records (logs).

It should be appreciated that the foregoing general description and further detailed description are solely illustrative and explanatory, and do not limit the claimed invention.

BRIEF DESCRIPTION OF THE DRAWINGS

The provided drawings, which are included into the present description of the invention and constitute its part, illustrate embodiments of the invention and serve to explain the invention principles along with the description.

DETAILED DESCRIPTION

Figure 1:
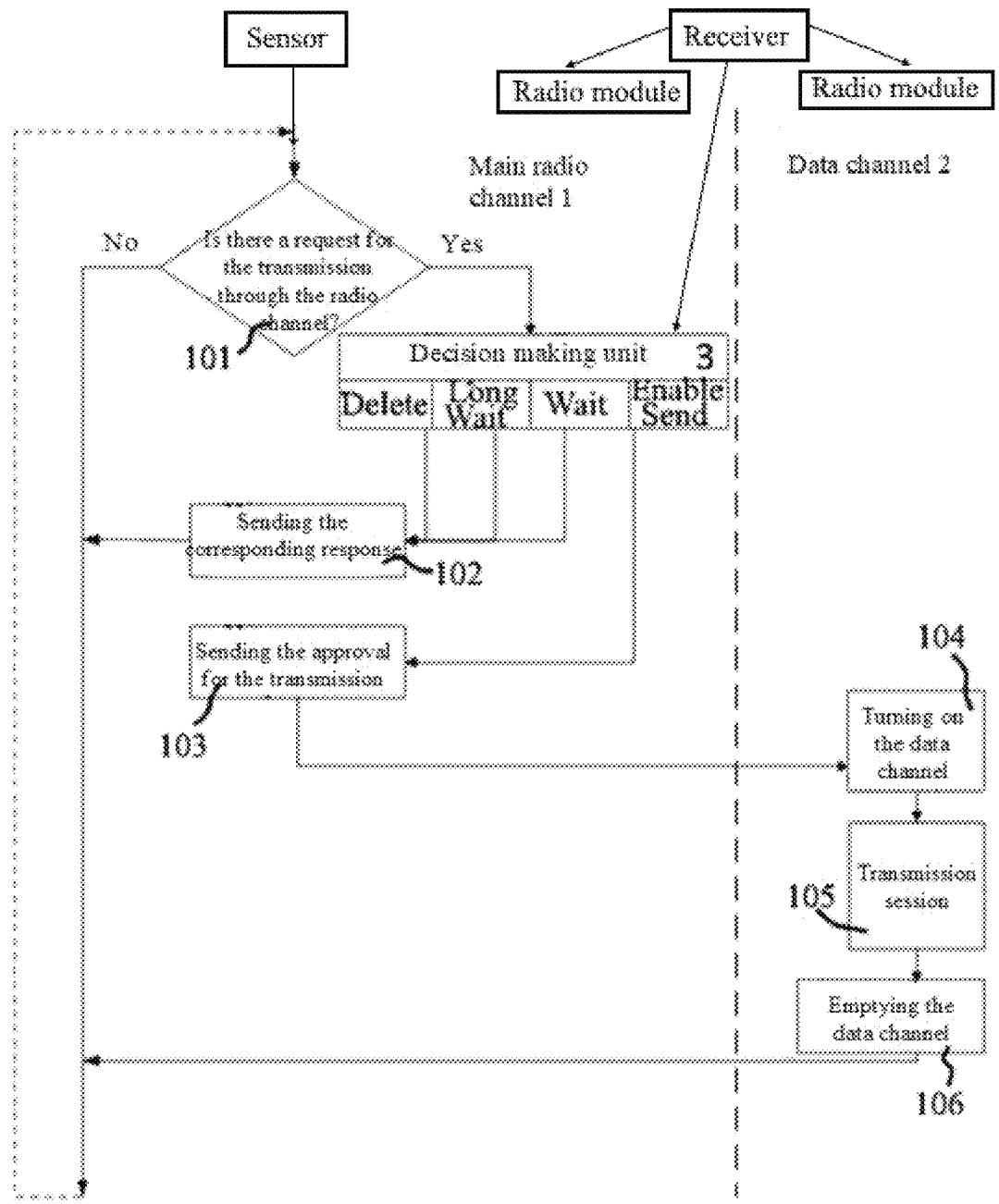
FIG. 1 is a simplified diagram that demonstrates the wireless communication system operation.

An illustrative embodiment of the invention is described hereinafter in detail using said figures. Implementations, which are disclosed in the following description of the embodiment, do not encompass all implementations of the invention, rather they serve solely to provide an additional explanation of the essence thereof.

The wireless safety system comprises a receiver and at least one sensor, which are coupled by means of a radio communication and have therebetween a main radio channel 1 with TDMA (Time Division Multiple Access) and a separate data channel 2 (a radio channel 2) that is configured to perform a continuous data transmission. The separate data channel 2 is individually assigned for a single separate sensor, wherein it may not be time-limited, rather it may be completely used for needs of this sensor. In this data channel 2, there is no TDMA that is present in the main radio channel 1, thus, there are no temporary limitations for the presence, and the sensor may "broadcast" within it for a long time. Since this is the separate radio channel, it enabled to raise the data transmission rate therein by two times due to reduction of the signal deviation without losing the range. Therewith, the main radio channel 1 may continue to service other sensors by receiving statuses and alarms from them.

Said radio channels 1 and 2 are distributed across frequencies to provide a maximum quick and reliable operation of both channels.

The receiver comprises at least two radio modules, in particular, RFM-modules (Radio Frequency Module), one of them is reserved only for creation of the separate data channel 2, wherein the transmission of the data of high volumes occurs. The second radio module is engaged in a continuous exchange with other sensors (statuses/alarms). Also, the receiver comprises a decision making unit 3 that controls the receipt of the data through the data channel 2.

The sensor is configured to transmit an alarm signal in response to a periodical requesting of the sensor status from the receiver, a periodicity and an interval of sending the response are determined preliminary. Also, the sensor in this system is configured to terminate the data transmission or to send the request to the receiver in absence of the response from the receiver to the alarm signal in response.

The method for the data transmission by means of said wireless safety system is implemented as follows. The exchange of data and/or data announcements, which are transmitted, is continuously performed between the sensor and the receiver through the main radio channel 1 by sending statuses and/or alarm signals according to the established rules and requirements. Therewith, the continuous data exchange is provided by one module of the receiver using the main radio channel 1, and the activation of the data channel 2 followed by transmission of large volumes of data is provided by another radio module of the receiver.

According to FIG. 1, the sensor sends, through said main radio channel 1 by means of the alarm signal "Data Pending", the request regarding the necessity of the data transmission through the separate data channel 2 (step 101). The alarm signal "Data Pending" includes a description of a type of data, an information regarding a number of data and a size thereof, a code of the alarm with which this data is associated.

Then, by means of the decision making unit 3, the receiver sends to the sensor a signal (step 102) regarding:
beginning of the data transmission, or
re-transmission of the request for using the data channel 2 after a some time (a "Wait" command), or
removal of the data and withdrawal of the request (a "Delete" command), or
temporary withdrawal of the request until a separate command from the receiver is received (a "LongWait" command).

The beginning of the data transmission means that the receiver sends to the sensor a command to begin the communication session at the data channel 2 for transmission of the data (Enable send, step 103).

Re-transmission of the request for using the data channel 2 after some time ("Wait" command) will be performed if the data channel 2 is occupied and it will imply a repetition of the attempt to transmit the data in 3 seconds.

Removal of the data and withdrawal of the request (a "Delete" command) will be performed if the data for the receiver does not make any interest (after the receiver has checked the data announcement) and it will imply removal of the data by the sensor, withdrawal of the request from its side, and assignment of the status of the successful data transmission.

The temporary withdrawal of the request until a separate command from the receiver is received (a "LongWait" command) will be performed if there is a large queue of the requests for transmission and it will imply withdrawal of the request at the moment and resume of the request either after a separate command from the receiver or after appearance of a new data.

Any of said decisions is immediately sent to the sensor in addition to the response to the alarm.

After the signal regarding the beginning of the data transmission is received, the sensor begins to transmit the data through the data channel 2. Prior to the beginning of the data transmission through the data channel, performing a synchronization by transmitting an information regarding a position of the data within a time slot by the sensor to the receiver (step 201). Also, prior to the beginning of the data transmission through the data channel 2, the sensor transmits the information regarding the size and number of the packets by which the data transmission will be performed (step 202). Then, the sensor transmits the data through the data channel 2 by the continuous series of the data packets (steps 104, 105). The sensor may transmit the data through the data channel 2 by the continuous series of the data packets both within a single window and within several successive windows, which are numbered. During transmission within several successive windows, the sensor transmits a maximum number of the packet that will be transmitted within this window to the receiver prior to the transmission of the window.

At the end of the data transmission the receiver sends the request with a control number of packets to confirm a completeness of the data transmission. After the control number of the packets and the fact that the data has been completely transmitted from the sensor are confirmed, i.e. the current session of the data transmission has been completed, the data channel 2 is emptied for a next session of the data transmission (step 106). In case an error or errors is/are occurred, not more than 5 repetitions of the windows will occur for each transmission session. If there are non-received packets after all the repetitions, the session will be repeated in future. After the session of the data transmission is completed, the sensor will switch to the operation through the main radio channel 1.

To resume receiving of the series of the data packets, for which the transmission has been interrupted, in response to the signal regarding the beginning of the data transmission informing, by the receiver, the sensor an address of a last received byte from a beginning of an array without gaps or nothing (nulls) to transmit the data from the beginning of the data array and the sensor begins to transmit the last received byte.

The above-described method within the wireless safety system is preferably used to transmit data of photographic images taken by the sensor (such data usually has a relatively large volume). However, such method is also suitable for the transmission of test data files or files with a software upgrade, or files with event records (log files) etc. In case a series of photographic images, which were taken by the sensor successively, are sent, it will be possible to form an animation or a simplified video, thereby enabling to establish/confirm a fact of a treat and an intervention process, other improper activities.

Figure 2A:
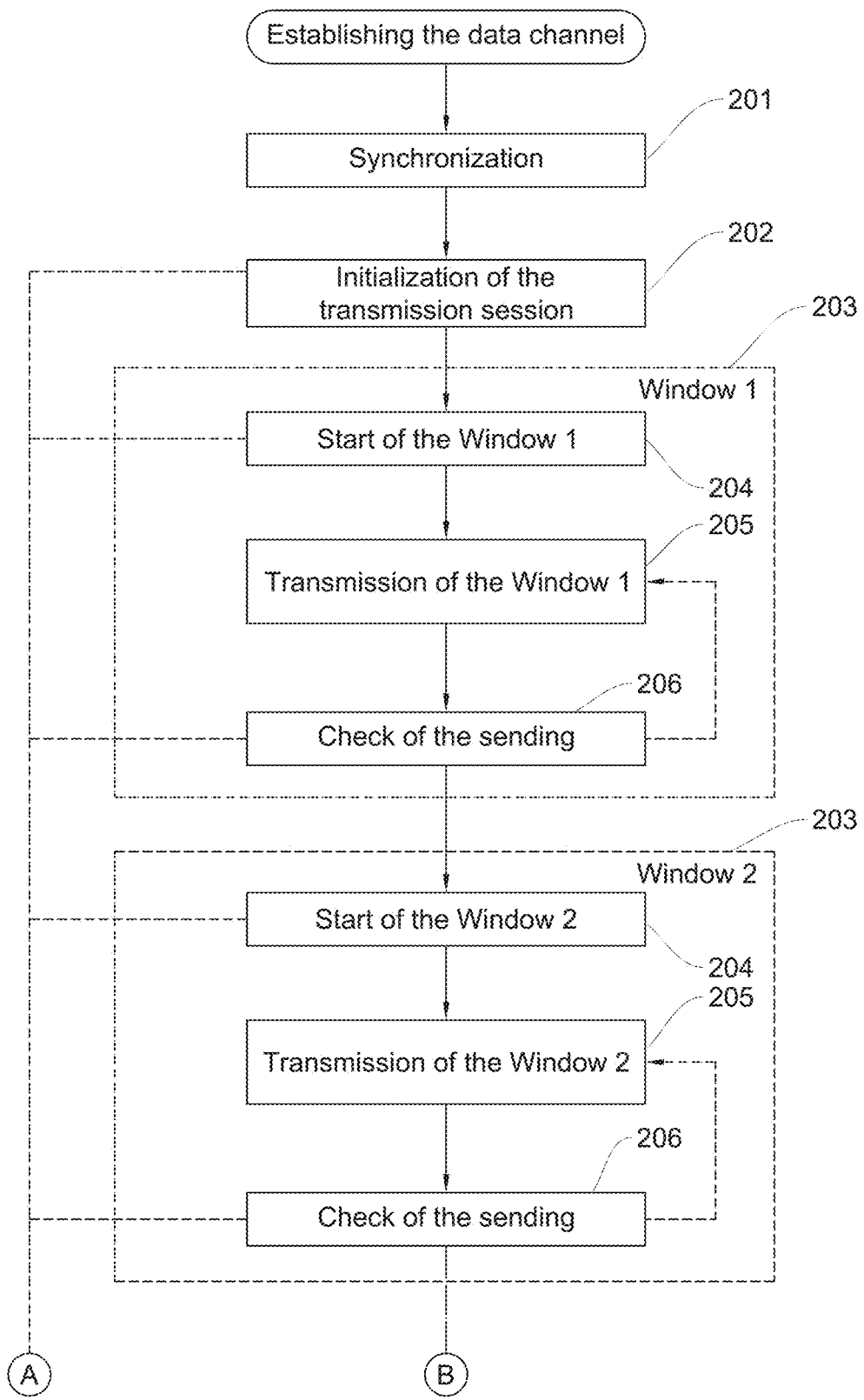
FIGS. 2A and 2B are diagrams that demonstrate the entire session of the data transmission from the beginning to the end at the data channel.
Figure 2B:
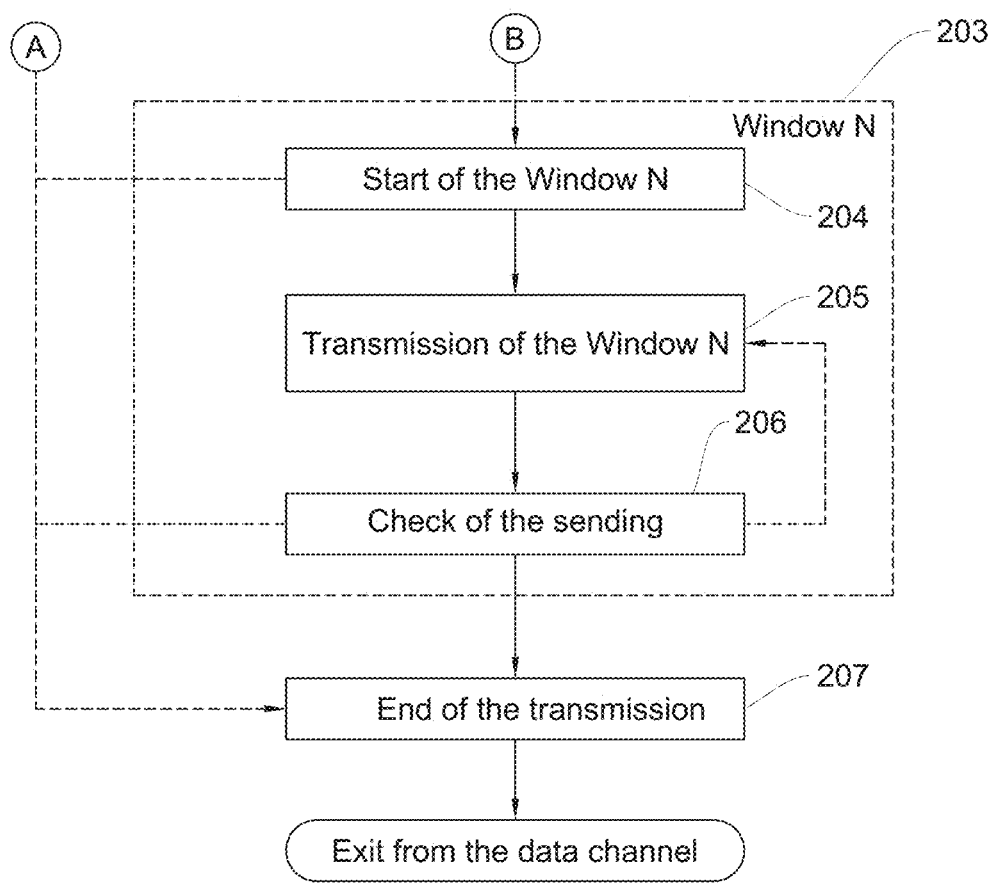

According to FIGS. 2A and 2B, the entire session of transmission of the data having a large volume through the data channel 2 is performed as follows from the beginning until the end.

The session of transmission of the data having a large volume is completely performed at the data channel 2 without any attempt to switch to any other channel. Only after the transmission is completed or interrupted, the sensor will switch to the main channel 1 and continue its usual operation.

At the moment of the transmission, the data channel 2 is completely assigned to the sensor and to the receiver exclusively, at this time, another device in this system is not able to occupy the data channel.

The size of the packet during a single transmission session is constant, but it may be selected for each transmission in terms of convenience, possibilities of the sensor, and transmission optimality (time/number of errors). At present, for the STM8 (microcontroller which the sensor is mounted on), a fixed size of 50 bytes is used, this size is selected based on a maximum possible packet for the radio module (54 bytes of data).

The following commands are used in the session of the transmission of the data having a large volume:
17—mc_TakeMySynchro (Transmission of the information regarding intrinsic synchronization);

106—mc_Transferinitiate (Attempt to begin transmission of a buffer with the data);
107—mc_SendInitiate (Beginning of the transmission of the data window);
108—mc_TransferData (Transmission of the data as such);
109—mc_EndOfSend (Checking for non-delivered packets);
110—mc_EndOfTransfer (Termination of the transmission of the buffer with the data).

At the step of synchronization (step 201), i.e. prior to the beginning of the transmission, the sensor transmits the information regarding the beginning of its slot (time passed from the beginning of the slot) in the command mc_TakeMySynchro (17). The sending occurs for 25 times per one dispatch, without repetitions, each time the value is updated until the receiver confirms the received information. The sensor sends 25 identical dispatches (not the same one, but each time with the actual biasing time). If there is no response to each of 25 dispatches is received, the sensor will continue the transmission session, since this is not a crucial matter for the transmission. The received needs this information only when using a hopping of the data channel 2 in order to switch the frequency in a synchronous manner with the sensor. An unsynchronization of more than 3 ms may lead to a loss of the packets at moments of switching.

Then, a step of initializing the transmission session 202 is performed—the mc_Transferinitiate command (106). At this step, the sensor informs a general information for the transmission: a type of the transmitted information (an image, a software, logs, other), a number of the transmitted array, its size, a size of the packets, and an additional field specifically for the images being a number of the alarm which this image is associated with. If the receiver has received this data array previously (the numbers coincide), but the process has been interrupted, in order to save time, it may inform an address of the last received byte from the beginning of the array without gaps to the sensor. Otherwise, nulls or nothing is sent in the response, then the sensor will continue the transmission from the beginning of the array.

In case the address of the byte that differs from null is indicated in the response, the sensor will begin the transmission from the packet that comprises this byte (due to the different size of the packet, the information may be repeated on several latest bytes) or from the packet that comes immediately after the mentioned byte.

The request is sent with 25 repetitions. In case of non-receipt of the response, the transmission session will be interrupted immediately.

Then, regardless of whether the transmission occurs from the beginning of the array or from a certain location, the entire array is labeled by chunks according to the announced size of the packet. The chunk is a piece of information that is used in many formats of files, preferably, multimedia ones. Each piece comprises a header that indicates certain parameters and a variable region that follows the header and comprises data. The chunks are numbered with two bytes, thus, a theoretical maximum size of the array for the packet of 50 bytes (STM8) may constitute 3276750 bytes (a bit more than 3 Mb). Then, the sensor comes up with the size of the window that depends on the size of the internal buffer. Also, in order to preserve the response of the transmission (to enable timely interruption thereof, if necessary), the time for the window transmission must not exceed 5 sec. When one packet of 18 ms is transmitted, it will correspond to 277 packets. Thus, the size of the window is selected to be not more than 300 packets.

It is possible not to divide the transmission into windows, and to send everything in a single window. Such variant is also possible, then the repetitions of the necessary packets are generated only at the end of the entire array and they may count not more than 5. As for the case with windows, the repetitions may count for 5*N, where N is a number of the windows. The windows result in more uniform, controllable transmission with higher guarantee of delivery.

Then, a step of transmitting the window 203 is performed. At the beginning of each window (Window 1, Window 2 ... Window N) the sensor announces the start of the process by means of the command mc_SendInitiate (107), step 204. The maximum number of the packet that will be transmitted in this window is transmitted in the command. When requesting the repetitions, the receiver may request any packet from the beginning of the array to the mentioned number of the packet, not higher.

The announcement also follows with 25 repetitions and in case of non-receipt, the transmission session will be interrupted immediately.

If the confirmation is received, the sensor begins to "pour" the chunks by means of the command mc_TransferData (108) without repetitions, confirmations, and pauses until the previously announced maximum window packet is received (step 205). Here, it is expedient (but not mandatory) to create the window of not more than 5 sec—350 packets. In the process of transmission, the sensor is "deaf" and does not listen to the commands from the receiver, and, thus, is fully unable to react to the attempts from the receiver, if such attempts will be present, until the very end of the transmission of the window.

Afterwards, the sensor requests the receiver what the receiver has managed to receive until the present moment (step 206). The request is made by means of the command mc_EndOfSend (109).

If the number of the non-delivered packets is less than 20% of the transmitted window, it will be possible to proceed to the next window and to include the packets requested for the repetition thereto. Otherwise, there are 5 attempts to repeat the non-delivered packets. If 20% and more of the non-delivered packets remain after the 5th attempt, the transmission session will be interrupted.

Also, in response to this request, the receiver may request for the termination of the transmission session.

Then, a step of terminating the session 207 is performed. The session is always terminated by the command mc_EndOfTransfer (110). It transmits a result of the session termination (success/failure, a reason of the failure), a number of the repetitions (of all the windows in total) and the control sum for adjusting the transmission mechanism. If the session has been terminated prior to the end of the transmission, this command will be sent at the end anyway with an indication of reasons for the emergency termination (the requirement from the receiver's side is the reason as well and it may be received at any step of the transmission).

The invention claimed is:

1. A method for transmitting data by a sensor of a wireless safety system that comprises at least one sensor and a receiver, which are coupled by means of a radio communication, the method comprising: continuously exchanging data and/or data announcements, which are transmitted, by sending statuses and/or alarm signals through a main radio channel between the sensor and the receiver that is equipped with at least two radio modules, which are configured to perform the continuous data exchange, and activating a separate data channel for the data transmission using one of the radio modules that is not used for the main radio channel, and with a decision making unit, wherein the sensor, through said main radio channel by means of the alarm signal, sends a request regarding a necessary data transmission through the separate data channel to the receiver, by means of the decision making unit, the receiver sends to the sensor a signal regarding:
- beginning of the data transmission, or
- re-transmission of the request for using the data channel after a some time, or
- temporary withdrawal of the request until a separate command from the receiver is received, or
- removal of the data and withdrawal of the request,
- in response to the signal regarding the removal of the data and withdrawal of the request being received, the sensor will perform these actions and assign a status of a successful data transmission,
- in response to the signal regarding the re-transmission or regarding the temporary withdrawal of the request being received, the sensor will continue to send the request regarding the necessary data transmission through the separate data channel to the receiver until the signal regarding the beginning of the data transmission is received,
- in response to the signal regarding the beginning of the data transmission being received, the sensor will begin to transmit the data through the data channel by a continuous series of data packets, wherein at the end of the data transmission, the receiver sends a request with a control number of packets to confirm a completeness of the data transmission, after the control number of the packets and the fact that the data has been completely transmitted from the sensor are confirmed, the data transmission is terminated, and
- in response to there being no confirmation of the completeness of the data transmission, the transmission will be terminated and the sensor, after the data transmission is completed or terminated, switches to operation through the main radio channel, while the data channel is emptied for a next session of the data transmission.

2. The method for transmitting data by the sensor of the wireless safety system according to claim 1, wherein to resume receiving of the series of the data packets, for which the transmission has been interrupted, in response to the signal regarding the beginning of the data transmission providing, by the receiver, an address to the sensor, and
- wherein the address provided to the sensor is an address of a last received byte from a beginning of a data array without gaps or nothing to transmit the data from the beginning of the data array and the sensor begins to transmit the last received byte.

3. The method for transmitting data by the sensor of the wireless safety system according to claim 1, wherein the alarm signal includes a description of a type of data, an information regarding a number of data and a size thereof, a code of the alarm with which this data is associated.

4. The method for transmitting data by the sensor of the wireless safety system according to claim 1, wherein prior to the beginning of the data transmission through the data channel, performing a synchronization by transmitting an information regarding a position of the data within a time slot by the sensor to the receiver.

5. The method for transmitting data by the sensor of the wireless safety system according to claim 1, wherein prior to the beginning of the data transmission through the data channel, transmitting, by the sensor, the information regarding the size and the number of packets by which the data transmission will be performed.

6. The method for transmitting data by the sensor of the wireless safety system according to claim 1, wherein the sensor transmits the data through the data channel with a continuous series of data packets within a single window or within several successive windows, which are numbered.

7. The method for transmitting data by the sensor of the wireless safety system according to claim 6, wherein during transmission within several successive windows, the sensor transmits a maximum number of the packet that will be transmitted within a corresponding window to the receiver prior to the transmission of the window.

8. The method for transmitting data by the sensor of the wireless safety system according to claim 1, wherein in case an error has occurred, not more than 5 repetitions of windows occur for each transmission session.

9. The method for transmitting data by the sensor of the wireless safety system according to claim 8, wherein if there are non-received packets after all the repetitions, the data transmission session will be repeated in future.

10. The method for transmitting data by the sensor of the wireless safety system according to claim 1, wherein the data being transmitted is at least one photo file and/or test data, and/or software upgrades, and/or event records.

11. A wireless safety system that comprises a receiver and at least one sensor with a main radio channel with TDMA and a separate data channel between them, the data channel is configured to transmit data continuously, wherein said radio channels are distributed across frequencies, and the receiver comprises at least two radio modules, one of which is reserved only for creation of the separate data channel, and a decision making unit that is configured to control the data reception through the data channel.

12. The wireless safety system according to claim 11, wherein the sensor is configured to transmit an alarm signal with a repetition in preliminary determined intervals.

13. The wireless safety system according to claim 11, wherein the sensor is configured to terminate the data transmission or to send the request to the receiver in absence of a response from the receiver to the alarm signal in response.

14. The wireless safety system according to claim 11, wherein the data being transmitted is at least one photo file and/or test data, and/or software upgrades, and/or event records.

* * * * *